United States Patent
Mattis

[11] Patent Number: 5,889,284
[45] Date of Patent: Mar. 30, 1999

[54] LIQUID LEVEL GAUGE HAVING P-C BOARD ENCLOSED WITHIN PROBE

[75] Inventor: Donald J. Mattis, Norwalk, Conn.

[73] Assignee: Casco Products Corporation

[21] Appl. No.: 965,513

[22] Filed: Nov. 6, 1997

[51] Int. Cl.⁶ .................................................. G01F 23/00
[52] U.S. Cl. ........................ 250/577; 73/293; 340/619
[58] Field of Search .................................. 250/577, 902, 250/903; 73/293; 340/619, 620; 356/136

[56] References Cited

U.S. PATENT DOCUMENTS

| | | | |
|---|---|---|---|
| 3,272,174 | 9/1966 | Pribonic | 116/118 |
| 3,299,770 | 1/1967 | Witt et al. | 88/14 |
| 3,448,616 | 6/1969 | Wostl et al. | 73/293 |
| 3,766,395 | 10/1973 | Keir | 250/214 R |
| 3,834,235 | 9/1974 | Bouton et al. | 73/293 |
| 3,917,411 | 11/1975 | Schweizer et al. | 365/135 |
| 3,932,038 | 1/1976 | Schweizer et al. | 356/133 |
| 3,939,470 | 2/1976 | Arai et al. | 340/59 |
| 4,023,137 | 5/1977 | Olsbo et al. | 340/59 |
| 4,038,650 | 7/1977 | Evans | 73/293 |
| 4,134,022 | 1/1979 | Jacobsen | 250/577 |
| 4,242,590 | 12/1980 | von Tluck | 250/577 |
| 4,286,464 | 9/1981 | Tauber et al. | 73/293 |
| 4,354,180 | 10/1982 | Harding | 340/619 |
| 4,468,567 | 8/1984 | Sasano et al. | 250/577 |
| 4,513,277 | 4/1985 | Moore et al. | 340/59 |
| 4,644,177 | 2/1987 | Barabino | 250/577 |
| 4,840,137 | 6/1989 | Beauvais et al. | 116/277 |
| 4,859,987 | 8/1989 | Markus | 340/450 |
| 4,998,022 | 3/1991 | Tregay | 250/577 |
| 5,381,022 | 1/1995 | Nemeth et al. | 250/577 |

FOREIGN PATENT DOCUMENTS

| | | |
|---|---|---|
| 65798 | 1/1982 | European Pat. Off. . |
| 8903978 | 5/1989 | WIPO . |

OTHER PUBLICATIONS

Aeroquip, Tedeco Div. Bulletin, Tedeco Levelmaster 250 Series, #TDB L250 dated 1987, 2 pages.
Aeroquip, Tedeco Div. Bulletin, Tedeco Technology #TTN-2, 1986, Tedeco Levelmaster Electro-Optic Liquid Level Sensor, 2 pages.

*Primary Examiner*—Stephone Allen
*Attorney, Agent, or Firm*—Mitchell D. Bittman; K. Gibner Lehmann

[57] ABSTRACT

A liquid level gauge utilizes a liquid tight plastic envelope carrying an elongate p-c board that has a light source mounted so as to direct light laterally thereof, and a light sensor also mounted so as to receive light from a direction which is lateral of the board. The gauge further has a lens configuration which is part of the envelope, for providing a largely solid, reflective path for light which emanates at the light source and is to be received at the light sensor. The lens is capable of aiding in the establishment, at the exterior of the envelope, of a path which diverges from the solid reflective path when the exterior of the envelope is surrounded by liquid that has an index of refraction which is different from the index of refraction of the material of which the lens and envelope are constituted. Assembly is significantly simplified as compared with prior, known gauge constructions.

27 Claims, 2 Drawing Sheets

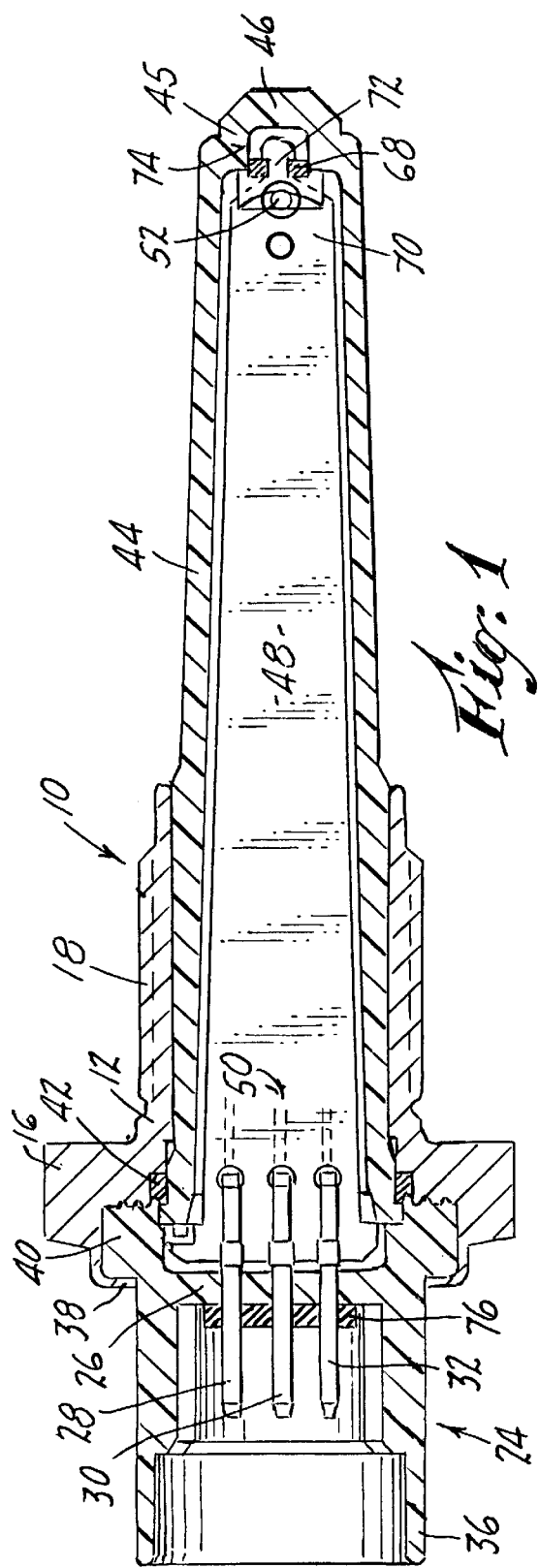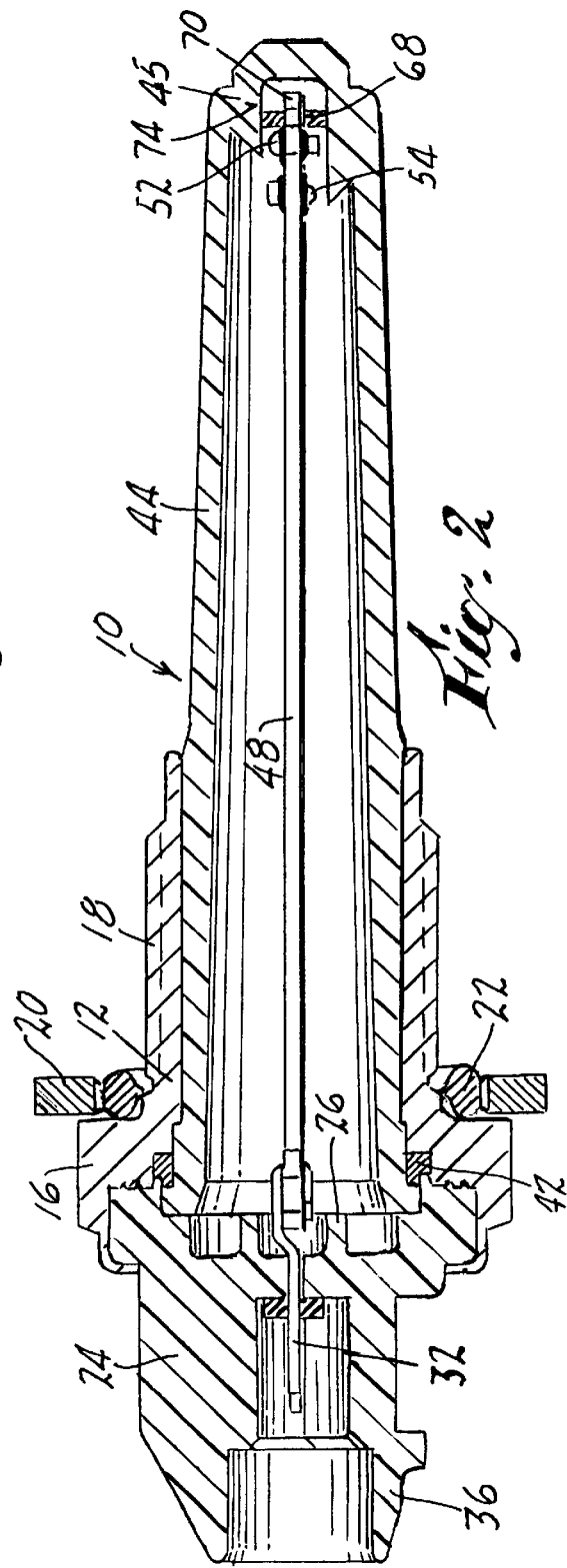

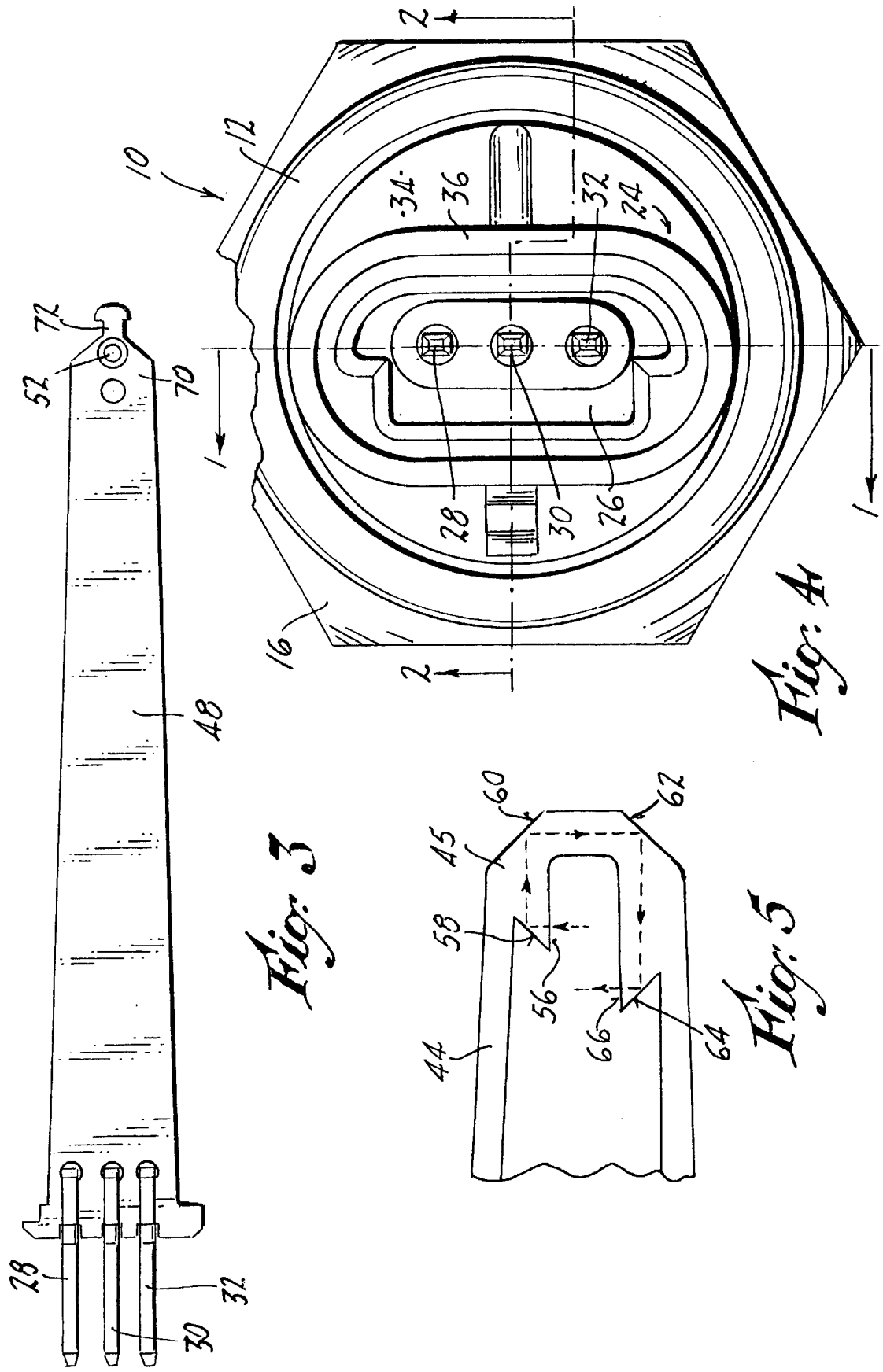

LIQUID LEVEL GAUGE HAVING P-C BOARD ENCLOSED WITHIN PROBE

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to liquid level gauges, and more particularly to gauges of the electronic type which utilize no moving parts.

More particularly, the invention relates to improvements in the gauge disclosed in U.S. Pat. No. 4,840,137 dated Jun. 20, 1989, entitled LIQUID LEVEL GAUGING APPARATUS, and having common ownership with the present application.

The entire disclosure of U.S. Pat. No. 4,840,137 is incorporated into the present application, by specific reference, in accordance with the practice set forth in MPEP §§ 608.01 (p), Revision 2, July, 1996.

2. Description of the Related Art Including Information Disclosed Under 37 CFR §§1.97–1.99

U.S. Pat. No. 4,840,137 above identified illustrates and describes a liquid level gauge having a semi-transparent cup-shaped housing with a closed end, the end having a configuration which forms a light-refracting prism. Mounted inside the housing are a light source and a light sensor. In the disclosed embodiment, both the source and the sensor are secured in operative positions by a carrier block (72). The latter has seats for the source and sensor, such that they are positioned so as to be slightly convergent with respect to one another. Essentially, the gauge detects variations in the light that is reflected interiorly of the lens when the latter becomes immersed in liquid. Changes in the light arriving at the sensor are converted to measurements of liquid level in the area exterior of the lens.

Relatively high-resolution measurements are possible with the disclosed arrangement. Due to space requirements and auto-motive vehicle manufacturers' constraints, following the filing of the patent application which matured into this patent, the disclosed design was modified to incorporate an elongate internal printed circuit board that contained the various electrical circuitry which was necessary in order to power the light source, as well as processing the output from the light sensor.

As a consequence of such modifications, one proposal was the mounting of the light source and light sensor on a miniature p. c. board that itself was disposed perpendicular to the main p. c. board.

However, a distinct drawback resided in the assembly of the miniature p. c. board, and establishment of electrical connections between the miniature board and the main, elongate p. c. board.

Furthermore, where the gauge was subjected to vibration, as in automotive applications, it had to be capable of reliable operation and over extended periods of use.

A fairly concise explanation of the theory of operation of gauges of the type to which this invention relates is given in U.S. Pat. No. 4,998,022 issued Mar. 5, 1991, entitled OPTICAL LIQUID LEVEL SENSOR USING A POLYTETRAFLUOROETHYLENE PERFLUOROALKOXY MATERIAL, assigned to Conax Buffalo Corporation, Buffalo, N.Y. Specific reference is made to the first sheet of drawings of this patent, and the description beginning at line 10 of col. 6 thereof. The entire disclosure of U.S. Pat. No. 4,998,022 is also incorporated into the present application, by specific reference, in accordance with the practice currently set forth in MPEP §§ 608.01 (p).

SUMMARY OF THE INVENTION

The above drawbacks of the patented gauges, and other refracting-type gauges in general, are largely overcome by the present invention, which has for one object the provision of a novel and improved liquid level gauge which is simple in construction, and reliable in operation.

Another object of the invention is to provide an improved liquid level gauge as above set forth, which is more easily assembled and less expensive to manufacture, since it lends itself to mass production techniques.

A related object of the invention is to provide an improved liquid level gauge in accordance with the foregoing, wherein the various components are protected against inadvertent contact with the liquid being gauged, and also are resistant to vibration, resulting in long life expectancy.

Still another object of the invention is to provide an improved liquid level gauge as above characterized, which is especially versatile, and which does not require adjustment following initial assembly.

Yet another object of the invention is to provide an improved liquid level gauge as above set forth, wherein the light sensor and light source, as well as the accompanying electrical circuitry, are all safely contained in a sealed housing.

A still further object of the invention is to provide an improved liquid level gauge of the kind indicated, wherein installation in a tank or vessel is simplified, requiring no special tools or fixtures.

In accomplishing the above objects the invention provides a device which responds to the attainment of a predetermined height of liquid in a vessel, comprising in combination an elongate p-c board having electrical circuitry, a light source mounted at one end of the p-c board to direct light laterally thereof, the light source being connected with the circuitry of the board, and light-responsive means mounted at the one end of the p-c board to receive light which is directed to the board laterally thereof. The light-responsive means is also connected with circuitry of the board. There is further provided an elongate fluid-tight envelope enclosing the p-c board, and lens means carried by the envelope for providing a largely solid, reflective path for light which emanates at the source and is received at the light-responsive means. The lens means is capable of aiding in the establishment, at the exterior of the envelope, of a path which diverges from the solid reflective path when the exterior of the envelope is surrounded by liquid that has an index of refraction which is different from the index of refraction of the lens means.

The arrangement is such that the light source and the light-responsive means can both be mounted directly on the p-c board in a lateral direction, along with the other components, and without the need of "pointing" either component toward the lens means. Significantly easier assembly and improved reliability are thus realized.

Other features and advantages will hereinafter appear.

BRIEF DESCRIPTION OF THE DRAWINGS

In the drawings, illustrating a preferred embodiment of the invention:

FIG. 1 is an axial sectional view of the liquid gauge of the present invention, the gauge comprising an envelope and an internal p-c board, and being adapted for monitoring the level of liquid contained in a vessel such as a gasoline tank, oil pan, or other liquid-containing reservoir of an automotive vehicle, for example.

FIG. 2 is an axial section of the gauge of FIG. 1, taken at a right angle thereto.

FIG. 3 is a plan view of the p-c board utilized in the gauge of FIGS. 1 and 2.

FIG. 4 is a left end view of the gauge of FIGS. 1 and 2, and

FIG. 5 is a diagrammatic representation of the lens means of the envelope of the gauge, showing the path of a beam of light that is mostly internally reflected within the lens means itself.

DESCRIPTION OF THE PREFERRED EMBODIMENT

FIGS. 1 and 2 illustrate a liquid gauge for detecting the presence or absence of liquid at a predetermined level in a tank or vessel. The gauge is generally designated by the numeral 10. In several respects the mounting structure of the present liquid gauge construction is similar to that shown in applicants' U.S. Pat. No. 4,840,137 above identified.

In particular, there is provided a tubular metal fitting 12 having a body, a hex head 16 and screw threads 18, to enable the fitting 12 to be inserted into a threaded hole (not shown) of the vessel with which the gauge is to be used. In accomplishing a seal with the wall of the threaded hole, there are provided a resilient seal ring 20 of rectangular cross section, and a resilient O-ring 22, both of which can be of conventional construction.

The fitting 12 carries a molded plastic electrical connector or terminal block 24 having a transverse wall 26 with three holes to accommodate three electrical male terminals or prongs 28, 30, and 32 for connection to a circuit board to be described below. The connector block 24 has a cup-shaped recess 34, FIG. 3, and an oval skirt 36 within which the prongs 28–32 are disposed, for connection to an electrical connector receptacle and associated wiring harness of an automotive vehicle (not shown).

The fitting 12 has an external flange 38 which is laid over a shoulder 40 of the connector block 24 as shown, to permanently retain the same. A seal between the fitting 12 and the connector block 24 is provided by an additional O-ring 42.

In accordance with the present invention there is provided a novel and improved plastic housing in the form of an elongate fluid tight, tube-like envelope or hollow tube 44 and one-piece, multi-faceted lens means 45, for providing a largely solid, reflective path for light generated internally of the envelope, and for aiding in the establishment, at the exterior of the envelope 44, of a light path which diverges from a predetermined internally-reflected light path only at those times that the envelope 44 is surrounded by liquid. In a typical case, the index of refraction of the liquid is different from the index of refraction of the plastic of which the envelope 44 is constituted. The lens means 45 is in the form of a conical prism 46, as shown. The elongate envelope and elongate p-c board have a generally common axis with one another.

Referring to FIGS. 1 and 2, there is mounted in the tube-like envelope 44, coincident with the axis thereof, an elongate p-c board 48 having electrical circuitry 50 shown diagrammatically in dotted outline in FIG. 1. Part of the electrical circuitry 50 comprises a light source and a light sensor. In a preferred application and as shown in the figures, the light source is in the form of a light emitting diode 52, and the light sensor comprises a phototransistor 54, preferably a Darlington type for improved sensitivity. The p-c board has a median line, and both the light emitting diode 52 and phototransistor 54 lie on the median line, with the light emitting diode 52 being disposed between the phototransistor 54 and the end or tip of the p-c board 48.

Further, in accordance with the invention, the light emitting diode 52 and phototransistor 54 are mounted directly on the p-c board 48 so as to be juxtaposed to one another, with the light emitting diode 52 facing in one direction laterally of the board 48, preferably perpendicular thereto, and the phototransistor 54 facing in the opposite direction laterally of the board 48, and also being preferably perpendicular thereto. The lens means 45 includes a plurality of prism surfaces, generally designated 56, 58, 60, 62, 64 and 66. One surface 56 is disposed directly in front of the light emitting diode 52, and another surface 66 is disposed directly in front of the phototransistor 54 when the p-c board 48 is secured in position inside the envelope 44, as in FIGS. 1 and 2. The arrangement is such that a light beam indicated by the arrows in FIG. 5 and emanating from the light emitting diode 52 can pass into the adjacent, light-receiving surface 56 and be internally reflected off the surface 58, so as to arrive at the surface 60. There, depending on whether or not the envelope 44 is immersed in liquid, the beam will either undergo an additional reflection toward the surface 62, or else will be diverted through the lens means 45 or prism 46, and will exit through the surface 60 and pass into the liquid. Under this latter condition the path of the beam of light diverges from its otherwise solid reflective path that lies entirely within the lens means.

On the other hand, in the absence of liquid at the surface 60, the reflected beam will thereafter experience another reflection toward the prism surface 62. This reflection will result in the beam being directed, internally of the plastic envelope, toward the surface 64 to the light-transmitting surface 66, from a perpendicular direction, and will pass through the surface 66 to be picked up by the phototransistor 54. Under such circumstance, the path for the beam of light is essentially through the solid plastic material of the envelope 44 and lens means 45. An electrical conduction condition of the phototransistor 54 results, giving rise to an indication that the envelope 44 is not immersed in liquid.

The electronics utilized with both the light emitting diode 52 and phototransistor 54 can take numerous forms. The three contact prongs 28, 30 and 32 provide electrical connections to the p-c board 48 from the vehicle wiring harness (not shown). The p-c board 48 also contains a number of electrically active and passive components (not shown) used to excite the light emitting diode 52 and to process the output from the phototransistor 54, these components being omitted from FIGS. 1–3, for purposes of clarity.

In addition, by the invention there is provided a cushioned mounting means between the remote end of the p-c board 48 and the envelope 44, comprising an O-ring 68. In a preferred embodiment the end of the p-c board 48 has a tip portion 70 with a head or enlargement, forming a neck 72, and the O-ring 68 fits over the enlargement and occupies the neck 72. The interior of the end of the envelope 44 has a cylindrical well at 74, and by the invention, constitutes a snug fit with the O-ring 68. The arrangement is such that the p-c board 48 is supported in a secure manner, resistant to shock or vibration. The desired, central positioning of the p-c board 48 is automatically effected by the resilient engagement of the O-ring 68 with the cylindrical inner surface 74 of the end of the envelope 44. The O-ring thus provides not only a cushion mounting for the p-c board, but also contributes to a slide fit between the tip portion 70 of the p-c board and the inner cylindrical surface of the envelope.

The envelope 44 is telescopically received in the fitting 12, and the O-ring 42 previously noted, also provides a seal with the envelope 44. FIG. 1 shows a layer of epoxy sealant 76 that has been applied to the transverse wall 26 adjacent the prongs 28–32, so as to seal the holes through which they extend.

The disclosed arrangement involving the disposition of the light emitting diode 52 and phototransistor 54 has a distinct advantage over prior gauges, most of which utilized a remotely located light source and a remotely located light sensor. Due to the present lateral disposition of the light emitting diode 52 and phototransistor 54, former problems with mounting these components are completely obviated, since the components are flat against the p-c board, along with the other active and passive electrical components. Thus, there are encountered no problems in establishing electrical connections thereto, unlike the arrangement utilized in the device of U.S. Pat. No. 4,840,137 above identified, where a separate supporting block was utilized to channel the electrical leads of the components 56 and 62, shown in FIG. 1 of that patent.

In practice, the p-c board 48 is keyed to the envelope 44, such that the board and envelope will have the relative positions shown, this being necessary for alignment of the prism surfaces 56–66 with the light emitting diode 52 and phototransistor 54, as well as alignment of the p-c board 48 with the prongs 28–32.

From the above it can be seen that I have provided a novel and improved liquid level gauge that is simple in its structure and reliable in use. The flush mounting of the light emitting diode 52 and phototransistor 54 on the p-c board 48 simplifies assembly. The support of the end of the p-c board 48 as provided by the O-ring 68 also facilitates assembly; it is important that this end not shift or vibrate in use, and the O-ring 68 effectively minimizes the possibility of this occurring.

The gauge as disclosed is thus seen to represent a distinct advance and improvement in the field of liquid level gauges.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A device which responds to the attainment of a predetermined height of liquid in a vessel, comprising in combination:
   a) an elongate p-c board having electrical circuitry thereon,
   b) a light source mounted at one end of the p-c board to direct light laterally thereof, said light source being connected with circuitry of the board,
   c) light-responsive means mounted at said one end of the p-c board to receive light which is directed to the board laterally thereof, said light-responsive means being also connected with circuitry of the board,
   d) an elongate fluid-tight envelope enclosing the p-c board, and
   e) lens means carried by said envelope for providing a largely solid, reflective path for light which emanates at said source and is to be received at said light-responsive means,
   f) said lens means being capable of aiding in the establishment, at the exterior of said envelope, of a path which diverges from said solid reflective path when said exterior of the envelope is surrounded by liquid which has an index of refraction that is different from the index of refraction of the lens means.

2. A device as set forth in claim 1, wherein there are means providing a slide fit between one end of the p-c board and one end of said envelope.

3. A device as set forth in claim 1, wherein there are cooperable means providing a mounting respectively between the other end of the p-c board and envelope.

4. A device as set forth in claim 2, wherein there are cushion means between the p-c board and envelope at the said slide fit.

5. A device as set forth in claim 4, wherein said cushion means comprises a resilient O-ring.

6. A device as set forth in claim 5, wherein said O-ring is carried by the said one end of the p-c board.

7. A device as set forth in claim 2, wherein said lens means comprises a multi-faceted one-piece light-transmitting structure having an axis, and having a well which is located on said axis and which receives the said one end of the p-c board.

8. A device as set forth in claim 1, wherein the light source and the light-responsive means are located on a median line extending between the ends of the elongate p-c board.

9. A device as set forth in claim 1, wherein the p-c board has a tip at its said one end and said light source is located between the said tip and the light-responsive means.

10. A device as set forth in claim 2, wherein the said envelope comprises a plastic tube having a closed end which comprises the said slide fit.

11. A device as set forth in claim 2, wherein the envelope comprises a light-transmitting plastic tube having a closed end which comprises the said lens means.

12. A device as set forth in claim 11, wherein the lens means comprises a conical exterior surface on the end of the plastic tube.

13. A device as set forth in claim 12, wherein the lens means includes pairs of prism surfaces inside of the envelope, disposed at opposite interior surfaces thereof.

14. A device as set forth in claim 13, wherein a surface of one pair of prism surfaces faces the said light source and a surface of another pair of prism surfaces faces the said light-responsive means.

15. A device as set forth in claim 14, wherein other surfaces of the pairs of prism surfaces are respectively angularly disposed with respect to the first-named surfaces of the pairs of prism surfaces.

16. A liquid level gauge, comprising in combination:
   a) a hollow tube having one closed end, for immersion in the liquid,
   b) a generally flat circuit board disposed inside said tube, and carrying a light source facing in a direction away from one side of the board, and carrying a light sensor facing in a direction away from the opposite side of the board, and c) prism means at the closed end, for receiving light from said light source and reflecting it internally toward the light sensor when the closed end of the hollow tube is not immersed in liquid, said prism means attenuating the light received at the light sensor as the closed end of the tube becomes immersed in said liquid.

17. A liquid level gauge as set forth in claim 16, wherein said prism has a light receiving surface disposed adjacent to the light source, and a light-transmitting surface disposed adjacent to the light sensor.

18. A liquid level gauge as set forth in claim 17, wherein said light-receiving and light-transmitting surfaces are substantially parallel to one another, and disposed on opposite sides of the circuit board.

19. A liquid level gauge as set forth in claim 17, wherein said light-receiving surface is disposed substantially in the path of light emitted by said light source.

20. A liquid level gauge as set forth in claim 17, wherein said light-transmitting surface is disposed immediately adjacent to said light sensor.

21. A liquid level gauge as set forth in claim 16, wherein the light-receiving surface is substantially coplanar with respect to the plane of the circuit board.

22. A liquid level gauge as set forth in claim 16, wherein the light-transmitting surface is substantially coplanar with respect to the plane of the circuit board.

23. A liquid level gauge as set forth in claim 16, wherein the light source and light sensor are spaced axially from one another on the circuit board.

24. A liquid level gauge as set forth in claim 16, wherein both the light source and the light sensor are spaced axially from the closed end of the hollow tube, and are spaced axially from one another.

25. A liquid level gauge as set forth in claim 16, wherein the end of the hollow tube has a generally conical exterior surface configuration.

26. A liquid level gauge as set forth in claim 25, wherein the conical surface configuration has an axis, and wherein the light-receiving surface and the light-transmitting surface are both substantially parallel to said axis.

27. A liquid level gauge as set forth in claim 16, and further including resilient cushioning means disposed in the hollow tube at its closed end and engaging the circuit board, so as to centralize the latter in the tube.

* * * * *